Figure 1:
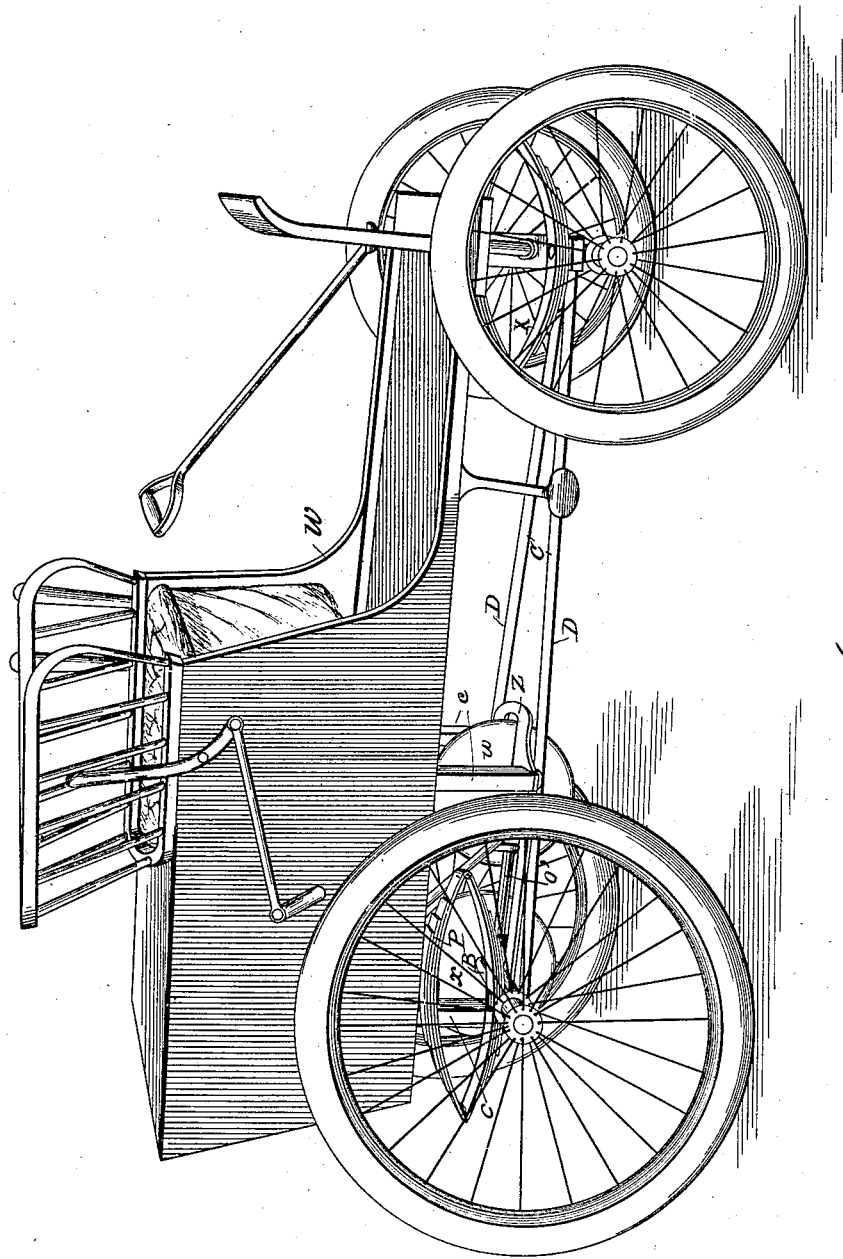

No. 648,654. Patented May 1, 1900.
H. CRAMER.
AUTOMOBILE CARRIAGE.
(Application filed Jan. 2, 1900.)
(No Model.) 3 Sheets—Sheet 1.

Witnesses
C. H. Walker
J. W. Garner

Howard Cramer Inventor
By his Attorneys,
C. A. Snow & Co.

No. 648,654. Patented May 1, 1900.
H. CRAMER.
AUTOMOBILE CARRIAGE.
(Application filed Jan. 2, 1900.)
(No Model.) 3 Sheets—Sheet 2.
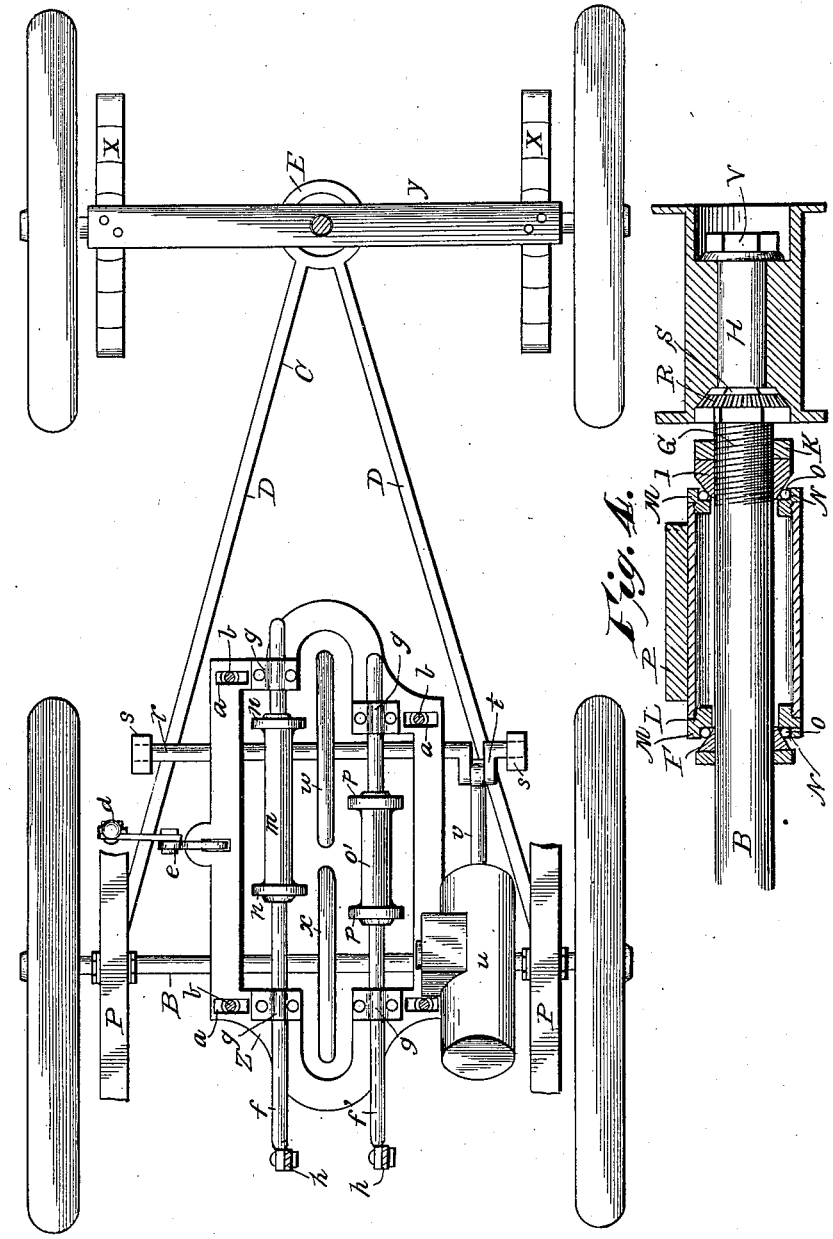
Witnesses Howard Cramer Inventor
By his Attorneys.

No. 648,654. Patented May 1, 1900.
H. CRAMER.
AUTOMOBILE CARRIAGE.
(Application filed Jan. 2, 1900.)
(No Model.) 3 Sheets—Sheet 3.
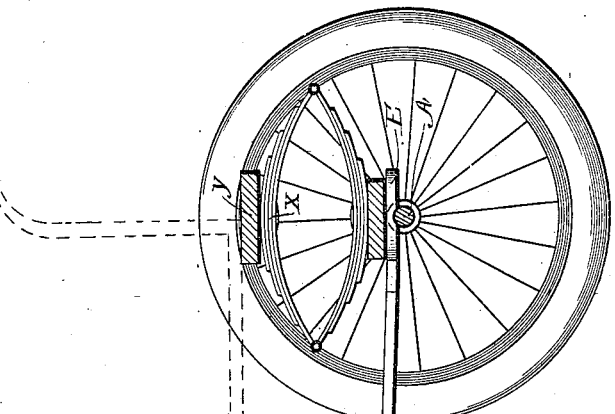
Fig. 6.
Fig. 5.
Fig. 5.
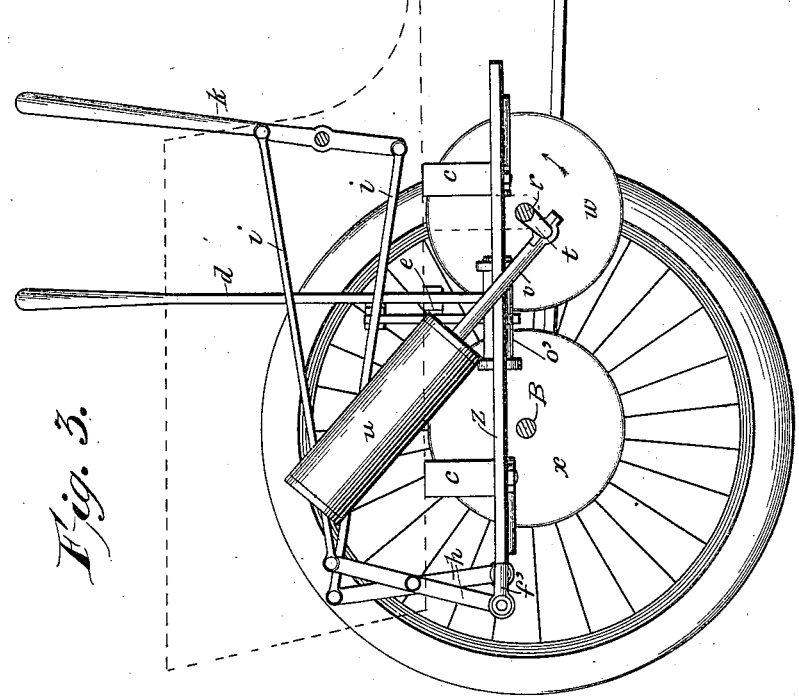
Witnesses  Howard Cramer Inventor
By his Attorneys, ns
UNITED STATES PATENT OFFICE.

HOWARD CRAMER, OF NEWBERRY, PENNSYLVANIA, ASSIGNOR OF ONE-HALF TO THOMAS M. ROBBINS, OF WILLIAMSPORT, PENNSYLVANIA.

AUTOMOBILE CARRIAGE.

SPECIFICATION forming part of Letters Patent No. 648,654, dated May 1, 1900.

Application filed January 2, 1900. Serial No. 106. (No model.)

*To all whom it may concern:*

Be it known that I, HOWARD CRAMER, a citizen of the United States, residing at Newberry, in the county of Lycoming and State of Pennsylvania, have invented a new and useful Automobile Carriage, of which the following is a specification.

My invention relates to improvements in automobile carriages, the object of my invention being to provide a simple and efficient mechanism adapted to start, stop, reverse, and vary the speed of an automobile carriage without affecting the operation of the motor thereof, and thereby give the operator perfect control of the automobile carriage under all conditions.

To this end my invention consists in the combination, with a vehicle driving-shaft having a friction wheel or disk and a power-shaft having a friction wheel or disk, of longitudinally and laterally movable friction-spools disposed on opposite sides of said friction wheels or disks and having bearing-faces adapted to contact therewith, the length of one spool exceeding that of the other, said longer spool being disposed so that its bearing-faces are adapted to engage the friction wheels or disks at points in advance of the shafts thereof and said shorter spool being disposed between said shafts and adapted to engage the said friction wheels or disks at points between said shafts, whereby the vehicle driving-shaft may be rotated in either direction, the speed thereof varied, or the same caused to cease rotating without varying the speed or direction of rotation of the power-shaft.

My invention further consists in the peculiar construction and combination of devices hereinafter fully set forth, and particularly pointed out in the claims.

In the accompanying drawings, which illustrate my invention, Figure 1 is a perspective view of my improved automobile carriage. Fig. 2 is a top plan view of the running-gear thereof, showing my improved devices for starting, stopping, reversing, and varying the speed of the automobile carriage. Fig. 3 is a longitudinal sectional view of the same. Fig. 4 is a detail sectional view of one of the axles and its spindle, showing the bearing for the axle and means for locking the wheel thereto. Fig. 5 is a detail perspective view of one of the axle-spindles. Fig. 6 is a detail view of the inner side of one of the wheel-hubs.

A represents the front axle, which is connected to the rear axle B by the reach C, which is of the form shown in Figs. 1 and 2, and consists of the rearwardly-diverging bars D and the fifth-wheel E, formed at the converging front ends of said bars. The rear axle or vehicle driving-shaft B is provided near each end with a friction-cone F and has screw-threads G, extending inwardly a suitable distance from the shoulder of the spindle H. On the said threaded portion are screwed an adjustable friction-cone I and a jam-nut K for locking said cone at any required adjustment. A tubular casing L is placed on said vehicle driving-shaft near each end thereof, and each of said casings is provided with caps M, which are screwed into the ends thereof and are provided with ball-races N for the reception of the ball-bearings O, which operate in said races and bear upon the friction-cones, as shown in Fig. 4. The rear ends of the bars of the reach are secured to the said tubular casing, and on the same are located the rear springs P of the carriage. On each spindle of the vehicle driving-shaft is placed a cog-cone R, having an angular shouldered portion S on its front side, the said cog-cone and said angular shouldered portion fitting into and being socketed in a correspondingly-formed recess T in the inner end of the wheel-hub U. To the outer end of the spindle of the vehicle driving-shaft is screwed the usual retaining-nut V for the hub, the cog-cone and hub-sockets serving to lock the wheel to the spindle.

The front end of the body W of the automobile carriage is supported by the springs X, which are carried by the usual bolster Y, and the rear end of the said body is supported on the springs P. The body of the carriage may be of any preferred construction or design.

Z represents a laterally-movable frame which is substantially oblong in shape and is provided at its corners with a series of transverse slots $a$, which receive the reduced portions $b$ of the lower ends of the supports $c$, which depend from and are secured to the bottom of the carriage-body. This construction enables the said frame Z to be moved laterally under the carriage by a suitable lever $d$ at one side of the carriage and connections $e$ between the said lever and the said frame. A pair of longitudinally-movable shafts $f f'$ are secured in bearings $g$ on the laterally-movable frame and are parallel with each other, and the said shafts are connected by means of pivoted links $h h'$ and rods $i i'$, respectively, to a hand-lever $k$, by means of which the said shafts may be moved endwise simultaneously in opposite directions. If preferred, however, a separate hand-lever may be employed for and connected to each shaft. On the shaft $f$ is journaled a friction-spool $m$, having the treads or disks $n$ at its ends, and on the shaft $f'$ is journaled a similar friction-spool $o'$, having the treads or disks $p$ at its ends. The said friction-spools while being movable endwise by their shafts rotate loosely on the said shafts. The power-shaft $r$ is journaled in suitable bearings $s$, which depend from the body of the automobile carriage, the said shaft having a crank $t$ and being operated by a motor of any suitable construction, either steam, compressed-air, electric, or other type of motor, as preferred. For the purpose of illustration an oscillating cylinder $u$ of a motor is indicated in the drawings and also a piston-rod $v$, connected to the crank of the power-shaft. On the central portion of the power-shaft is keyed a suitable friction wheel or disk $w$ of suitable size, and on the vehicle driving-shaft B is keyed a similar friction wheel or disk $x$, the said friction wheels or disks being located between the friction-spools, as shown in Fig. 2, and by moving the frame Z laterally either of the said friction-spools may be thrown into contact with the said friction wheels or disks, and thereby communicate motion from the power-shaft to the vehicle driving-shaft, as will be readily understood, or the said frame Z may be moved so as to cause both of the said friction-spools to be out of contact with the said friction wheels or disks, and thereby disconnect the power from the vehicle driving-shaft, while permitting the rotation of the power-shaft to be continued. In Fig. 2 of the drawings the said frame and friction-spools are shown in this position.

It will be observed by reference to Fig. 2 of the drawings that the friction-spool $m$ is longer than the friction-spool $o'$ and that said friction-spool $m$ is disposed in advance of the friction-spool $o'$, the treads of the latter being adapted to bear upon the portions of the friction-wheels $w x$ which are between the shafts B $r$ and that the treads of the friction-spool $m$ are only adapted to operate upon those portions of said friction-wheels which are in advance of their respective shafts. Hence, assuming the shaft $r$ to be rotating, when the treads of the longer spool $m$ are in engagement with the wheels $w x$ the shaft B will be caused to rotate in the same direction as the shaft $r$; but when the treads of the spool $o'$, which is located or disposed between said shafts, engage the proximate portions of the wheels $w x$ the shaft B will be rotated in the reverse direction to that of the shaft $r$.

The operation of my improved automobile carriage is as follows: Assuming the power-shaft to be in rotation in the direction indicated by the arrow on the friction-wheel $w$ in Fig. 3, when the laterally-movable frame is shifted by the lever $d$, so as to cause the friction-spool $o'$ to engage and come in frictional contact with the friction-wheels $w x$, the said friction-spool will cause the rotation of the wheel $w$ to be communicated to the friction-wheel $x$, keyed on the vehicle driving-shaft, and the automobile carriage will be propelled ahead. When the shaft $f'$ is moved forwardly by the lever $k$, so as to cause the front tread of the friction-spool $o'$ to move toward the center of the friction-wheel $w$ and the rear tread of said friction-spool to move toward the perimeter of the friction-wheel $x$, the speed of the automobile carriage will be reduced proportionately, and when the said shaft $f'$ is moved rearwardly, so as to cause the forward tread of the friction-spool $o'$ to recede from the center of the friction-wheel $w$ and the rearmost tread of said friction-spool to approach the center of the friction-wheel $x$, the speed of the automobile carriage will be proportionately increased, as will be readily understood.

The friction-spool $m$ being on the opposite side of the friction-wheels from the friction-spools $o'$, said friction-spool $m$, when the frame $x$ is moved so as to cause it to come in contact with the friction wheels or disks and the friction-spool $o'$ to be moved out of contact with said friction wheels or disks, will reverse the movement of the automobile carriage and cause the same to back, the speed of the automobile carriage in backing being varied at the will of the operator by shifting the friction-spool M forward or rearwardly on the friction wheels or disks by means of the longitudinally-movable shaft $f$ and the lever $k$ and their connections.

It will be understood from the foregoing that my improved automobile carriage will be completely under the will of the operator at all times, that the same may be started, stopped, and reversed in the direction of its movement, and the speed thereof varied instantly simply by moving the levers $d k$ and without starting, stopping, reversing, or varying the speed of the motor in any way, the said motor when my automobile carriage is in use continuing constantly at work in a single direction.

A further advantage possessed by my improved automobile carriage is that by reason of the small number of the parts of its power-applying and speed-varying mechanisms the same may be manufactured economically and put upon the market at a reasonable cost very much less than that of the automobile carriages now in common use, and, moreover, by reason of the simplicity of the construction of my improved automobile carriage, the same is not likely to get out of order, and should any of the parts of the same become worn or broken they may be readily replaced at small cost.

Another advantage possessed by my improved automobile carriage is that any one may become qualified to operate it perfectly with little or no practice.

Having thus described my invention, what I claim is—

1. In combination with a vehicle driving-shaft having a friction wheel or disk, and a power-shaft having a friction wheel or disk, longitudinally and laterally movable friction-spools, disposed on opposite sides of said friction wheels or disks, and having bearing-faces adapted to contact therewith, the length of one spool exceeding that of the other, said longer spool being so disposed that its bearing faces or treads are adapted to engage the friction wheels or disks at points in advance of the shafts thereof, and said shorter friction-spool being disposed between said shafts and adapted to engage the said friction wheels or disks at points between said shafts, whereby the vehicle driving-shaft may be rotated in either direction and the speed thereof varied, or the same caused to cease rotating without varying the speed or direction of rotation of the power-shaft, substantially as described.

2. In combination with a vehicle driving-shaft having a friction wheel or disk, and a power-shaft having a friction wheel or disk, a laterally-movable frame, longitudinally-movable shafts in bearings on said frame, friction-spools on said shafts, and movable longitudinally therewith, disposed on opposite sides of said friction wheels or disks and having bearing faces or treads adapted to contact therewith, the length of one spool exceeding that of the other, said longer spool being so disposed that its bearing-faces are adapted to engage the friction wheels or disks at points in advance of the respective shafts thereof, the said shorter spool being disposed between said shafts and adapted to engage said friction wheels or disks at points between said shafts, a lever to operate the laterally-movable frame and thereby engage either of the friction-spools with the friction wheels or disks, or disengage both of said friction-spools therefrom, and a lever to operate the longitudinally-movable shafts, whereby the vehicle driving-shaft may be rotated in either direction, the speed thereof varied, or said shaft caused to cease rotating, without varying the speed or direction of rotation of the power-shaft, substantially as described.

3. The combination of a vehicle driving-shaft having the cog-cone and angular shoulders, of the wheel-hub having the cog and angularly-shouldered recess on its inner side adapted to receive said cog-cone and angular shoulders of said shaft, substantially as described.

In testimony that I claim the foregoing as my own I have hereto affixed my signature in the presence of two witnesses.

HOWARD CRAMER.

Witnesses:
W. H. KUNKLE,
JESSE SAVAGE.